(12) United States Patent
Luong et al.

(10) Patent No.: US 11,748,942 B2
(45) Date of Patent: Sep. 5, 2023

(54) SYSTEM AND METHOD FOR AUTOMATICALLY GENERATING TRAJECTORIES FOR LASER APPLICATIONS

(71) Applicants: Siemens Mobility Pty Ltd., Bayswater (AU); Siemens Ltd., Melbourne (AU)

(72) Inventors: Chuong Luong, East Victoria Park (AU); Martin Fankhauser, Bruck (AT); Christopher Whiteside, Victoria (AU); Marcus Clarke, Mount Martha (AU); Walter Meyler, Lysterfield (AU)

(73) Assignees: Siemens Mobility Pty Ltd, Bayswater (AU); Automation Innovation Pty Ltd, Keysborough (AU)

( * ) Notice: Subject to any disclaimer, the term of this patent is extended or adjusted under 35 U.S.C. 154(b) by 369 days.

(21) Appl. No.: 16/992,493

(22) Filed: Aug. 13, 2020

(65) Prior Publication Data

US 2022/0048080 A1 Feb. 17, 2022

(51) Int. Cl.
*G06T 17/00* (2006.01)
*G05B 19/19* (2006.01)

(52) U.S. Cl.
CPC .............. *G06T 17/00* (2013.01); *G05B 19/19* (2013.01)

(58) Field of Classification Search
CPC ............... G06T 17/00; G06T 2200/08; G06T 2207/10028; G06T 2207/20084; G05B 19/19; B23K 26/36; B25J 11/0055; B25J 19/023; B25J 9/1664; B25J 9/1697
See application file for complete search history.

(56) References Cited

U.S. PATENT DOCUMENTS

| | | | |
|---|---|---|---|
| 5,643,367 A | 7/1997 | Viel | |
| 11,325,256 B2 * | 5/2022 | Gaschler | B25J 9/1664 |
| 2015/0055085 A1 | 2/2015 | Fonte et al. | |
| 2016/0016312 A1 * | 1/2016 | Lawrence, III | B25J 9/1697 901/41 |
| 2017/0182722 A1 | 6/2017 | Matsumura et al. | |
| 2021/0046642 A1 * | 2/2021 | Luis y Prado | B25J 11/0055 |
| 2022/0048080 A1 * | 2/2022 | Luong | B25J 9/1697 |
| 2022/0161493 A1 * | 5/2022 | Atmur | B29C 64/273 |

FOREIGN PATENT DOCUMENTS

WO 2019213698 A1 11/2019

OTHER PUBLICATIONS

International Search Report on PCT/US2021/045838.*
(Continued)

*Primary Examiner* — Carlos R Ortiz Rodriguez

(57) ABSTRACT

A system for automatically generating trajectories of an object includes a trajectory generation module comprising a visual control algorithm and a processor configured via computer executable instructions to receive raw three dimensional (3-D) sensor data of an object, create a 3-D model of the object based on the raw 3-D sensor data, extract object features relating to a shape and/or surface from the 3-D model of the object, and generate trajectories based on the object features of the 3-D model of the object.

14 Claims, 3 Drawing Sheets

(56) References Cited

OTHER PUBLICATIONS

Anonymous: "Support-vector machine—Wikipedia"; Aug. 12, 2020; pp. 1-20; Retrieved from the Internet: URL: https://en.wikipedia.org/w/index.php?title=Support-vector machine&oldid=97251624.
Oehm, Daniel: "Unsupervised Random Forest Example—Daniel Oehm Gradient Descending"; International application No. PCT/US2021/045838; Relevant to olaim No. 9,17; Jun. 8, 2018; pp. 1-9; XP055856790; Retrieved from the Internet: URL: http://gradientdescending.com/unsupervised-random-forest-example/.
PCT International Search Report and Written Opinion of International Searching Authority dated Nov. 18, 2021 corresponding to PCT International Application No. PCT/US2021/045838 filed Aug. 13, 2021.

\* cited by examiner

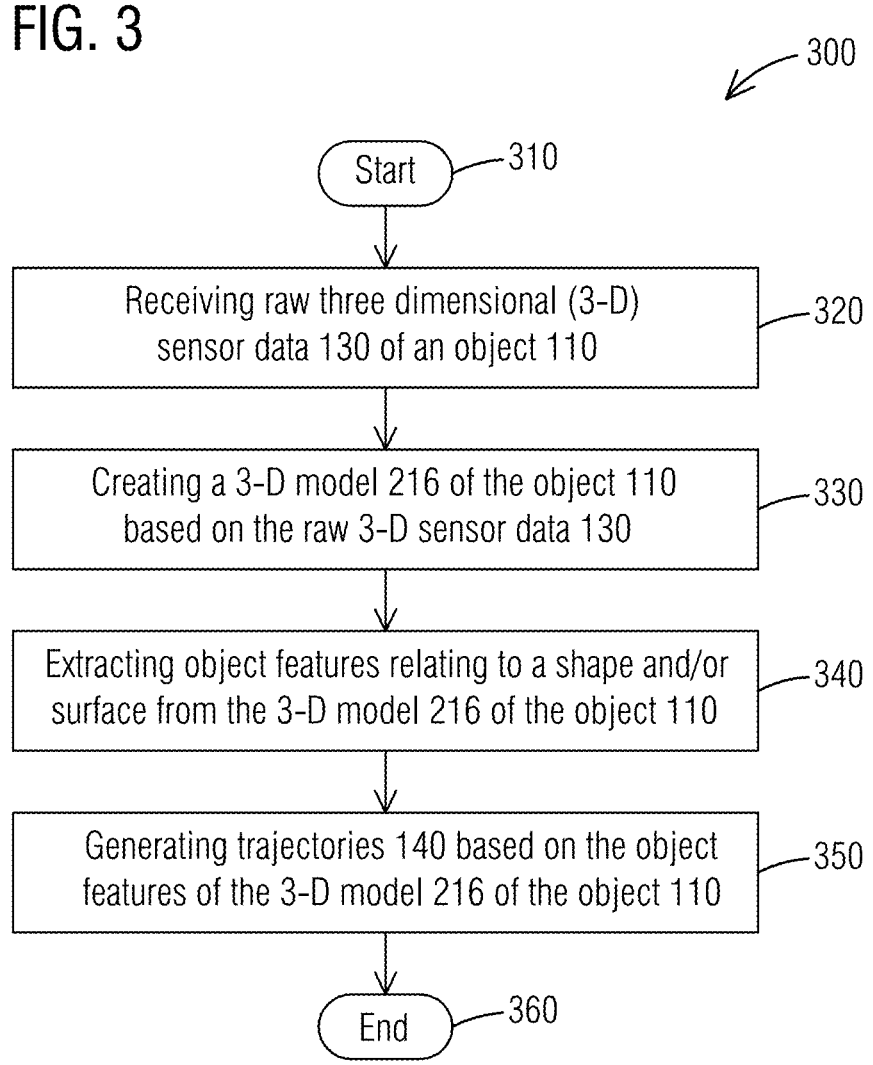

SYSTEM AND METHOD FOR AUTOMATICALLY GENERATING TRAJECTORIES FOR LASER APPLICATIONS

BACKGROUND

1. Field

Aspects of the present disclosure generally relate to systems and methods for generating trajectories, for example used in connection with laser applications.

2. Description of the Related Art

A laser can be utilized in many different fields and applications. One example of a laser application is laser cleaning apparatus for cleaning of molds in the manufacture of glass bottles. One common process to manufacture glass bottles or containers is a multi-stage molding process. In a first stage, molten glass is poured into a first mold to form a parison of a certain shape and dimensions. In a second stage, the parison is moved to a second mold, where it is blown into the mold to take the final shape of the bottle or container. Typically, a graphite based lubricant solution is applied to the molds between each manufacturing cycle, to facilitate removal of the glass item from the mold. Over time, residual lubricant and/or other contaminants build(s) up as a scale on the molds. Therefore, the molds need to be periodically removed for cleaning.

Existing methods for cleaning molds include for example shot blasting the molds with ceramic, metal or sand beads. However, blasting erodes the parent material of the mold. This means that, over time, the mold tolerance deteriorates, and deterioration must be compensated for during the manufacturing process, for example by adding extra glass to the shot to maintain the volume of the container which can be very expensive, or alternatively the mold must be replaced, i.e. the cleaning process can decrease the lifespan of the mold.

SUMMARY

Briefly described, aspects of the present disclosure relate to systems and methods for generating or extracting trajectories, utilized for example in connection with one or more laser(s). The described systems and methods can be used in many different laser applications including but not limited to laser cleaning, laser cutting, laser polishing, laser grinding, etc.

A first aspect of the present disclosure provides a system for automatically generating trajectories of an object comprising a trajectory generation module comprising a visual control algorithm and at least one processor configured via computer executable instructions to receive raw three dimensional (3-D) sensor data of an object, create a 3-D model of the object based on the raw 3-D sensor data, extract object features relating to a shape and/or surface from the 3-D model of the object, and generate trajectories based on the object features of the 3-D model of the object.

A second aspect of the present disclosure provides a method for automatically generating trajectories of an object comprising, through operation of at least one processor, receiving raw three dimensional (3-D) sensor data of an object, creating a 3-D model of the object based on the raw 3-D sensor data, extracting object features relating to a shape and/or surface from the 3-D model of the object, and generating trajectories based on the object features of the 3-D model of the object.

A third aspect of the present disclosure provides a non-transitory computer readable medium encoded with processor executable instructions that when executed by at least one processor, cause the at least one processor to carry out a method for automatically generating trajectories of an object as described herein.

BRIEF DESCRIPTION OF THE DRAWINGS

FIG. 3 illustrates a flow chart of a method for automatically generating trajectories in accordance with an exemplary embodiment of the present disclosure.

DETAILED DESCRIPTION

To facilitate an understanding of embodiments, principles, and features of the present disclosure, they are explained hereinafter with reference to implementation in illustrative embodiments. In particular, they are described in the context of being systems and methods for automatically generating or extracting trajectories in connection with laser applications. Embodiments of the present disclosure, however, are not limited to use in the described systems, devices or methods.

An example of an existing laser application is a laser cleaning system used for cleaning molds including robotics and a laser. A control unit of the cleaning apparatus controls the robotics. Currently, before starting a cleaning process, mold profile data needs to be loaded or entered manually in the control software, or a specific type of mold manually selected if already existing in the control software. Thus, the process includes manual steps. Further, some users or operators of such a cleaning apparatus may have up to 2000 different types of molds and it can be very time consuming to pre-program the control software for each different type of mold.

Figure 1:
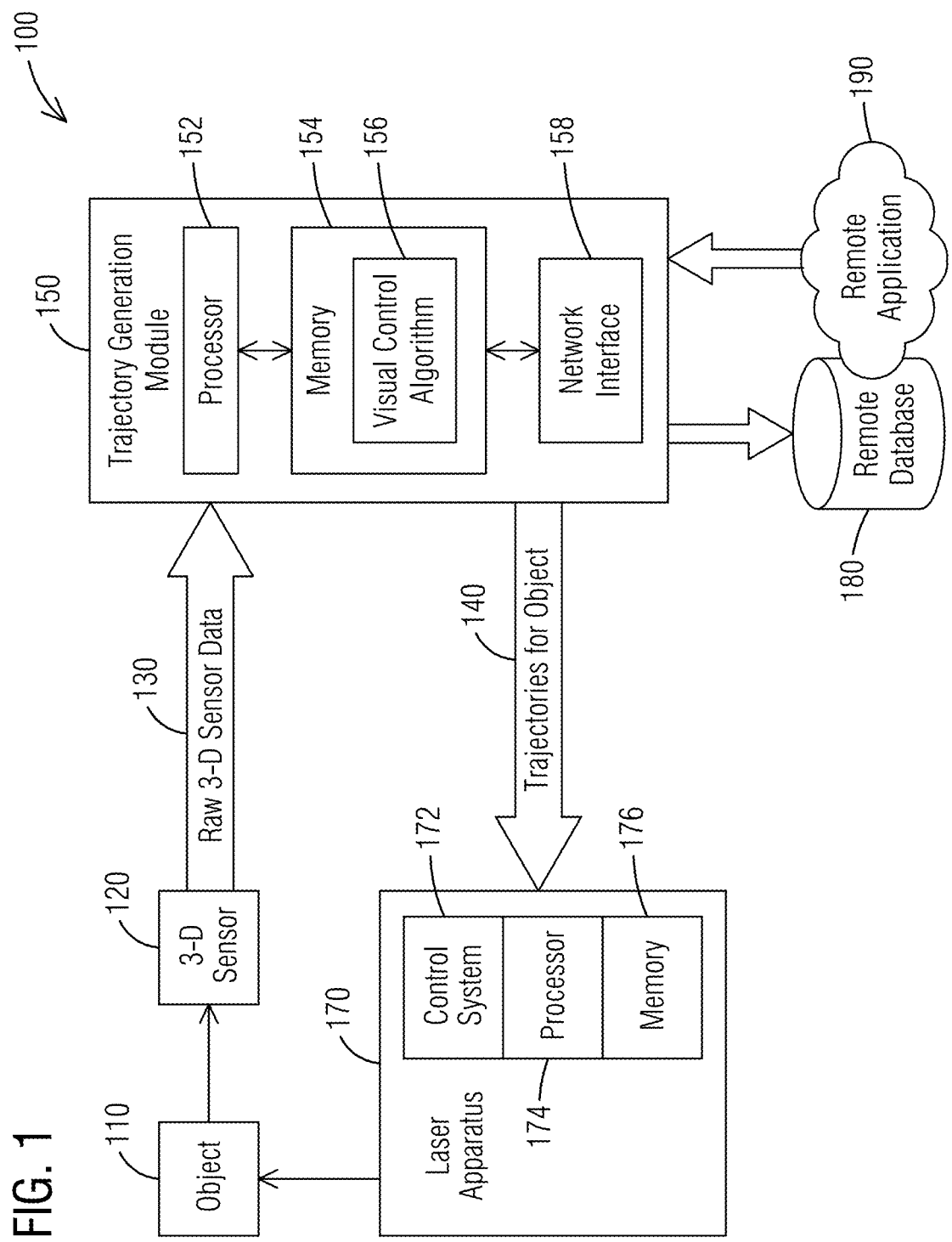
FIG. 1 illustrates a simplified diagram of a system for automatically generating trajectories in accordance with an exemplary embodiment of the present disclosure.

FIG. 1 illustrates a diagram of a system 100 for automatically generating trajectories in accordance with an exemplary embodiment of the present disclosure.

The system 100 provides automatic generation of trajectories of an object 110, for example in connection with laser applications. A trajectory as used herein refers to a path, route or track in relation to an object, wherein an apparatus, for example a laser apparatus, follows the trajectory through space. In our example of a laser cleaning application, a trajectory is a cleaning path for the laser apparatus in order to clean an object. In other applications, a trajectory may be a cutting path, a polishing path, a grinding path, etc. of a laser.

The system 100 includes a trajectory generation module 150 comprising different components, including at least one processor 152, a memory 154 and a network interface 158. The trajectory generation module 150 is configured to generate trajectories of object 110. To generate as used herein means for example to produce, to create or to calculate trajectories based on sensor data of the object 110 provided by one or more sensor(s) 120, specifically three-dimensional (3-D) sensor(s). The object 110 can include many different types of objects including articles, items, pieces, bodies that are treated or processed within a laser application, for example a mold for laser cleaning, a tile article for laser cutting, a metal body for laser polishing etc. Although system 100 illustrates only one object 110, the trajectory generation module 110 may be configured to receive or collect and process raw sensor data from many objects 110.

In an exemplary embodiment, the trajectory generation module 150 is configured to perform one or more algorithms(s) including a visual control algorithm 156 stored in memory 154. The trajectory generation module 150 is configured, through operation of the at least one processor 152, to receive and process raw sensor data 130, specifically raw three dimensional (3-D) sensor data, of the object 110. The raw sensor data 130 is obtained for example by scanning of the object 110 utilizing the one or more 3-D camera(s) or 3-D sensor(s) 120. The raw sensor data 130 is input to the trajectory generation module 150 which receives and processes the raw sensor data 130 using one or more algorithm(s) including the visual control algorithm 156. The trajectory generation module 150 then creates a 3-D model of the object 110 based on the raw 3-D sensor data 130, extracts object features relating to a shape and/or surface of the object 110 from the 3-D model of the object 110 and generates trajectories 140 based on the object features of the 3-D model of the object 110.

The object features relating to a shape and/or surface of the object 110 comprise at least edges and depths of the object 110. This means that the trajectory generation module 150 is configured to extract edges and depths in the 3-D computer model of the object 110. The generated paths or trajectories 140 consider a size of the object 110 and characteristics such as depth, faces and top and bottom. The generated path or trajectory 140 are output in vectors in an x, y, z format.

In an example, the visual control algorithm 156 is based on mathematical models such as for example one or more statistical models. In general, a statistical model is a mathematical representation of observed data and embodies a set of statistical assumptions concerning the generation of sample data. In our example, the trajectory generation module 150 calculates the trajectories 140 based on the raw sensor data 130 and by using a statistical model. Such a statistical model can be created based on previously observed data of one or more objects and trajectories generated based on the observed data.

In another embodiment, the trajectory generation module 150 is configured to display the 3-D model of the object 110 on a display 210 of a user interface device (see FIG. 2), such as for example a personal computer (PC), human machine interface (HMI) panel, tablet, smartphone, etc. In addition, the trajectory generation module 150 can be configured to display the generated trajectories 140 on the display 210 of the user interface device.

In a further embodiment, the system 100 comprises a control system 172 of a technical apparatus or system. The technical apparatus or system can be for example a laser apparatus 170 comprising one or more lasers. The trajectory generation module 150 is configured to output the trajectories 140 to the control system 172 for controlling the apparatus or system utilizing the calculated trajectories 140. The technical apparatus or system, for example laser apparatus 170, is configured to perform a process or action of the object 110. Such a process or action of the laser apparatus 170 comprises for example laser cleaning, laser cutting, laser polishing or laser grinding of the object 110. Of course, it should be noted that the technical apparatus or system can include many other laser applications or different technical applications other than laser applications where trajectories or paths of an object can be used.

In another embodiment, certain data or key points of a scanned object 110 are transmitted or provided and stored in a remote database 180 and processed by a remote application 190. In an example, remote database 180 and remote application 190 can be cloud-based. In another example, the remote database 180 and application 190 can be located on a central server or central control system. Such a central server or control system may be provided by a user or operator of the system 100.

The trajectory generation module 150 sends the data or key pints to the remote database 180 and application 190 via the network interface 158. Communication networks for transmitting the data include wireless networks, such as for example Internet, or wired networks.

Data provided to the remote database 180 and application 190 can include some or all of the raw 3-D sensor data 130, some or all of the generated trajectories 140 and/or the 3-D computer model of the object 110. Key points of a 3-D model can be considered as a 'fingerprint' of the model of a respective object 110. Multiple data and/or fingerprints of a specific object 110 can be compared between scans, wherein the different scans and associated data can be used for optimizing and improving the visual control algorithm 156.

Over time, raw sensor data 130 from many objects 110 from many different locations or sites where the described systems or methods are installed and used, is collected in the remote database 180 and can then be used to optimize the visual control algorithm 156 and the generation of trajectories 140. For example, multiple locations use the laser cleaning apparatus for cleaning the glass molds, and each location may use the same type of glass mold. When the type of glass mold is scanned and processed at the different location, certain data and key points of each scan are sent to the remote application 190 and database 180 and are used for optimizing the visual control algorithm 156. The remote application 190 is configured to optimize (improve, enhance) the visual control algorithm 156, for example by applying unsupervised machine learning technique(s). Continuously or periodically, an improved or optimized version of the visual control algorithm 156 is deployed or delivered to the many different locations or sites where the described systems and methods are installed and used. Thus, the system 100 receives an optimized algorithm 156 resulting in improved or optimized trajectories 140 and optimized operation of the laser apparatus 170.

The trajectory generation module 150 may be embodied as software or a combination of software and hardware. The trajectory generation module 150 may be a separate module or may be an existing module programmed to perform a method as described herein. When embodied as a separate module, which can comprise multiple sub-modules, the trajectory generation module 150 is communicatively coupled with the control system 172 of the technical apparatus or system, such as laser apparatus 170. In another example, the trajectory generation module 150 may be incorporated, for example programmed, into an existing control system, such as control system 172, by means of software.

In exemplary embodiments, the processors 152, 174 may include one or more processing units, and the memories 154, 176 may include any of a wide variety of memory devices including volatile and non-volatile memory devices. The memories 154, 175 store software with one or more software applications. One of the applications of memory 154 includes the visual control algorithm 156 for calculating the trajectories 140 of the object 110. The memory 176 stores an application for controlling the laser apparatus 170. Of course, the control system 172 may perform many other applications and the trajectory generation module 150 may also perform other applications or processes.

Figure 2:
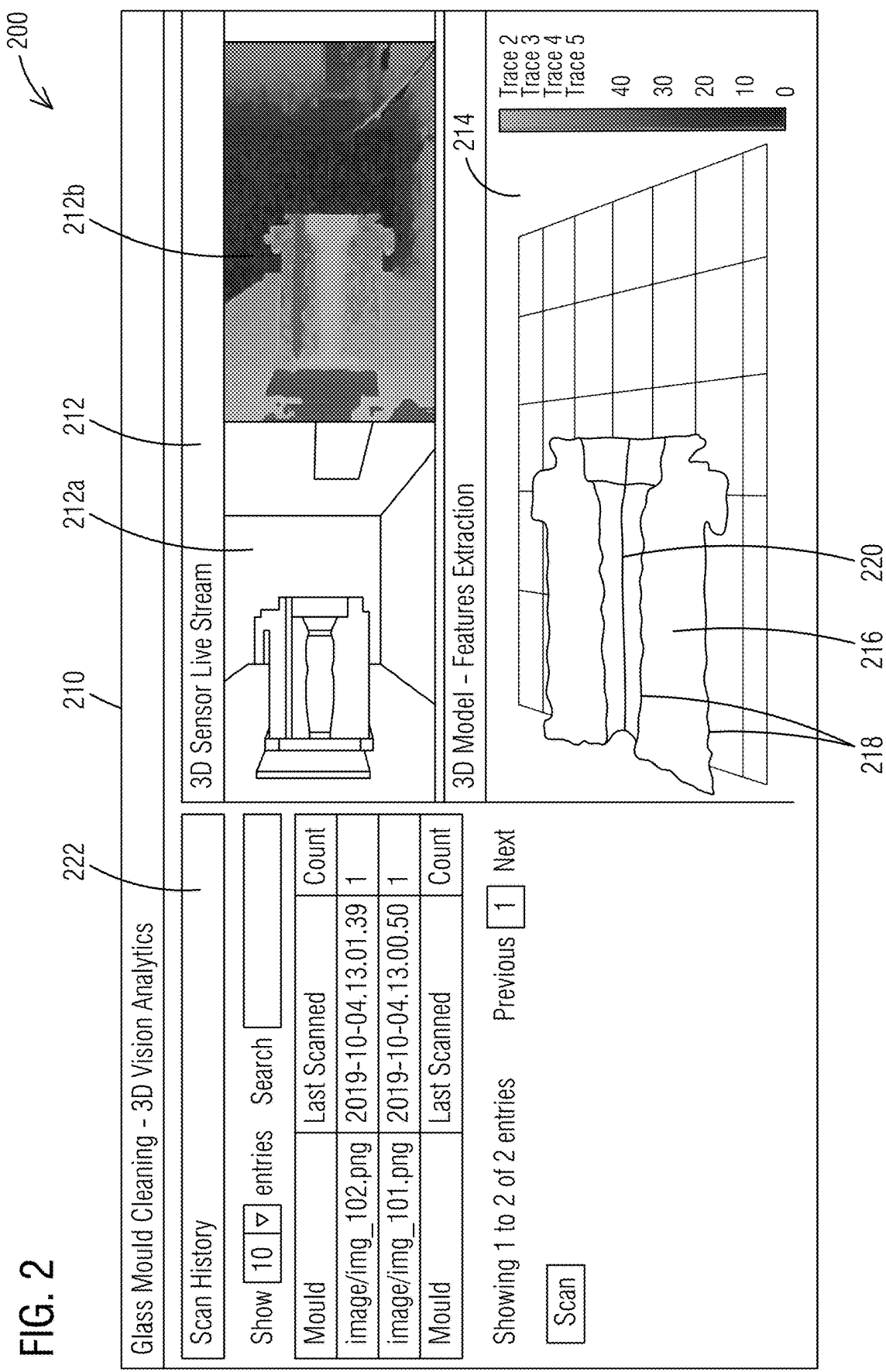
FIG. 2 illustrates a screenshot of a display of a user interface device in connection with a system for automatically generating trajectories in accordance with an exemplary embodiment of the present disclosure.

FIG. 2 illustrates a screenshot 200 of a display of a user interface device in connection with a system for automatically generating trajectories in accordance with an exemplary embodiment of the present disclosure.

Screenshot 200 is displayed on a display or screen 210 of a user interface device. A user interface device can be for example a personal computer (PC), human machine interface (HMI) panel, tablet, smartphone, etc.

In an embodiment, the trajectory generation module 150 is configured, through operation of the processor 152, to display data or information in connection with the generation of trajectories 140 on the screen or display 210. Multiple sections or areas provide different data. In a first section 212, a '3D Sensor Live Stream' is displayed. In our example, a 3-D sensor live stream of a glass mold (object 110) which is scanned by a 3-D sensor is shown. Section 212 shows different representations of the glass mold. The raw 3-D sensor data is captured and stored, and depth data converted into color which provides a representation 212b that looks similar to thermal imaging. The color data is combined with other data which then provides a video representation 212a of the glass mold.

In a second section 214, referred to as '3D Model—Features Extraction', a 3-D model 216 of the object 110 is shown. As described before, object features are extracted and/or identified in the computer model 216. The object features relate to a shape and/or surface of the computer model 216 of the object 110 and comprise for example edges 218 and depths of the object 110. For example, a trajectory of a centerline 220 is based on a median depth of an assumed corridor.

In a third section 222, referred to as 'Scan History', each object that has been scanned and processed is recorded along with date/time and count of scan. For each entry, the respective computer images/computer model 216 and corresponding data is stored in a database, for example the remote database 180, see FIG. 1, and can be retrieved from the database 180. In addition, the data may also be stored in a local database of the user interface device. In an embodiment, key points of each computer model 216 are stored in the database 180 and can be considered or labeled as 'fingerprint' of the respective model 216. The fingerprints of the model 216 can be compared between each scan, wherein the different scans of the model 216 and associated data can be used for optimizing and improving the visual control algorithm 156. As described earlier, see for example FIG. 1, the remote application 190 may utilize the data of the fingerprints of the different models 216 to optimize the algorithm 156, wherein an optimized algorithm 156 is then provided or uploaded in all the different places or locations (globally) where the algorithm 156 is stored and utilized.

FIG. 3 illustrates a flow chart of a method 300 for automatically generating trajectories in accordance with an exemplary embodiment of the present disclosure.

While the method 300 is described as a series of acts that are performed in a sequence, it is to be understood that the method 300 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 300 may start at 310. The method 300 may include an act or process 320 of receiving raw three dimensional (3-D) sensor data 130 of an object 110, an act or process 330 of creating a 3-D model 216 of the object 110 based on the raw 3-D sensor data 130, and an act or process 340 of extracting object features relating to a shape and/or surface from the 3-D model 216 of the object 110. The extracting of the object features comprises identifying edges and depths in the 3-D model 216 of the object 110. The method 300 may further include and an act or process 350 of generating trajectories 140 based on the object features of the 3-D model 216 of the object 110. The generating of the trajectories 140 comprises utilizing one or more statistical models. At 360, the method 300 may end.

It should be appreciated that the described method 300 may include additional acts and/or alternative acts corresponding to the features and elements described previously with respect to the system 100 and FIG. 1 and screenshot 200 and FIG. 2.

In an embodiment, the method 300 may further comprise outputting the trajectories 140 to a control system 172 of an apparatus and controlling the apparatus based on the trajectories 140. For example, the apparatus comprises a laser apparatus 170 configured to perform a process or action including laser cleaning, laser cutting, laser polishing or laser grinding of the object 110.

In another embodiment, the method 300 may further comprise displaying the 3-D model 216 of the object 110 and/or the trajectories 140 on a display 210 of a user interface device.

In another embodiment, the method 300 further comprises storing certain data or information of the object 110 in a remote database 180 and applying a remote application 190 comprising an unsupervised machine learning technique to optimize the visual control algorithm 156 and generation of trajectories 140.

The described system 100 and method 300 provide an algorithm 156 designed for generating trajectories or paths, such as laser cleaning paths of a glass mold, and programming or controlling an apparatus, such as a robot of a laser apparatus, during run time to perform a specific method or action utilizing the paths, such as for example laser cleaning of glass molds. Further, specific data and information are provided to a remote, for example cloud-based, database 180, for optimizing the algorithm 156. For example, the algorithm 156 learns new features as a centralized model and then updates sites using the algorithm 156, for example glass mold cleaning sites, all over the world. The algorithm 156 can be integrated into a control system, such as for example a laser cleaning control system.

By using a 3-D sensor, the shape/surface of the object 110 (mold) is scanned, and a 3-D model 216 generated. Based on the 3-D model 216 of the object 110, the algorithm 156 detects the features of the shape (edges, depths, etc.) and calculates several optimized trajectories 140 along the object's surface to optimize the corresponding process of the laser apparatus 170. This means that pre-programming of the control system 172 of the laser apparatus 170 is not required as the algorithm 156 and 3-D sensor data 130 enable any object 110 to be used. By optimizing the algorithm 156 and thus the trajectories 140, processing of the object 110, such as cleaning, is more precise and unnecessary steps are avoided which leads to higher efficiency. The trajectories 140 are generated at runtime, therefore mitigating manual programming and training for each object 110 separately.

It should be appreciated that acts associated with the above-described methodologies, features, and functions (other than any described manual acts) may be carried out by one or more data processing systems, such as for example trajectory generation module 150, via operation of at least one processor 152. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. The processor 152 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor 152 with the executable instructions (e.g., software/firmware apps) loaded/installed into memory 154 (volatile and/or non-volatile), which are currently being executed and/or are available to be executed by the processor 152 to cause the processor 152 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor 152 that is configured to carry out the particular processes and functions described/claimed herein. Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A system for automatically generating trajectories of an object comprising:
   a trajectory generation module comprising a visual control algorithm and at least one processor configured via computer executable instructions to
      receive raw three dimensional (3-D) sensor data of an object,
      create a 3-D model of the object based on the raw 3-D sensor data,
      extract object features relating to a shape and/or surface from the 3-D model of the object, and
      generate trajectories based on the object features of the 3-D model of the object,
   wherein the trajectory generation module further comprises a network interface, the trajectory generation module being further configured to send key data including the object features of the 3-D model to a remote database via the network interface,
   wherein the remote database is configured to collect key data of multiple objects transmitted by multiple trajectory generation modules at different locations or sites,
   wherein a remote application utilizes the key data of the multiple objects stored in the remote database to optimize the visual control algorithm by applying an unsupervised machine learning technique, and
   wherein an optimized version of the visual control algorithm is deployed periodically to the multiple trajectory generation modules at the different locations or sites.

2. The system of claim 1, further comprising:
   a control system of an apparatus, wherein the trajectory generation module is configured to output the trajectories to the control system for controlling the apparatus utilizing the trajectories.

3. The system of claim 2, wherein the apparatus comprises a laser apparatus configured to perform a process or action of the object based on the trajectories.

4. The system of claim 3, wherein the process or action of the laser apparatus comprises laser cleaning, laser cutting, laser polishing or laser grinding of the object.

5. The system of claim 1, wherein an extraction of the object features comprises identifying edges and depths in the 3-D model of the object.

6. The system of claim 1, wherein the trajectory generation module is further configured to display the 3-D model and associated trajectories of the object on a display of a user interface device.

7. The system of claim 1, wherein the visual control algorithm comprises one or more statistical models.

8. The system of claim 1, further comprising:
   at least one 3-D sensor or 3-D camera configured to scan the object and to provide the raw 3-D sensor data.

9. A method for automatically generating trajectories of an object comprising through operation of at least one processor:
   receiving raw three dimensional (3-D) sensor data of an object,
   creating a 3-D model of the object based on the raw 3-D sensor data,
   extracting object features relating to a shape and/or surface from the 3-D model of the object,
   generating trajectories based on the object features of the 3-D model of the object, sending, via a network interface, key data including the object features of the 3-D model of the object to a remote database, wherein the remote database is configured to collect key data of multiple objects transmitted by multiple trajectory generation modules at different locations or sites, storing the key data including the object features of the 3-D model of the multiple objects in the remote database, applying a remote application comprising an unsupervised machine learning technique to optimize the generation of trajectories, and deploying periodically an optimized version of the visual control algorithm to the multiple trajectory generation modules at the different locations or sites.

10. The method of claim 9, further comprising:

outputting the trajectories to a control system of an apparatus, and controlling the apparatus based on the trajectories.

11. The method of claim 10, wherein the apparatus comprises a laser apparatus configured to perform a process or action including laser cleaning, laser cutting, laser polishing or laser grinding of the object.

12. The method of claim 9, wherein the extracting of the object features comprises identifying edges and depths in the 3-D model of the object.

13. The method of claim 9, wherein the generating of the trajectories comprises utilizing one or more statistical models.

14. The method of claim 9, further comprising:

displaying the 3-D model of the object and/or the trajectories on a display of a user interface device.

* * * * *